April 6, 1943.    P. HAYMOND    2,316,066
CONTROL APPARATUS
Filed Aug. 3, 1940    2 Sheets-Sheet 2
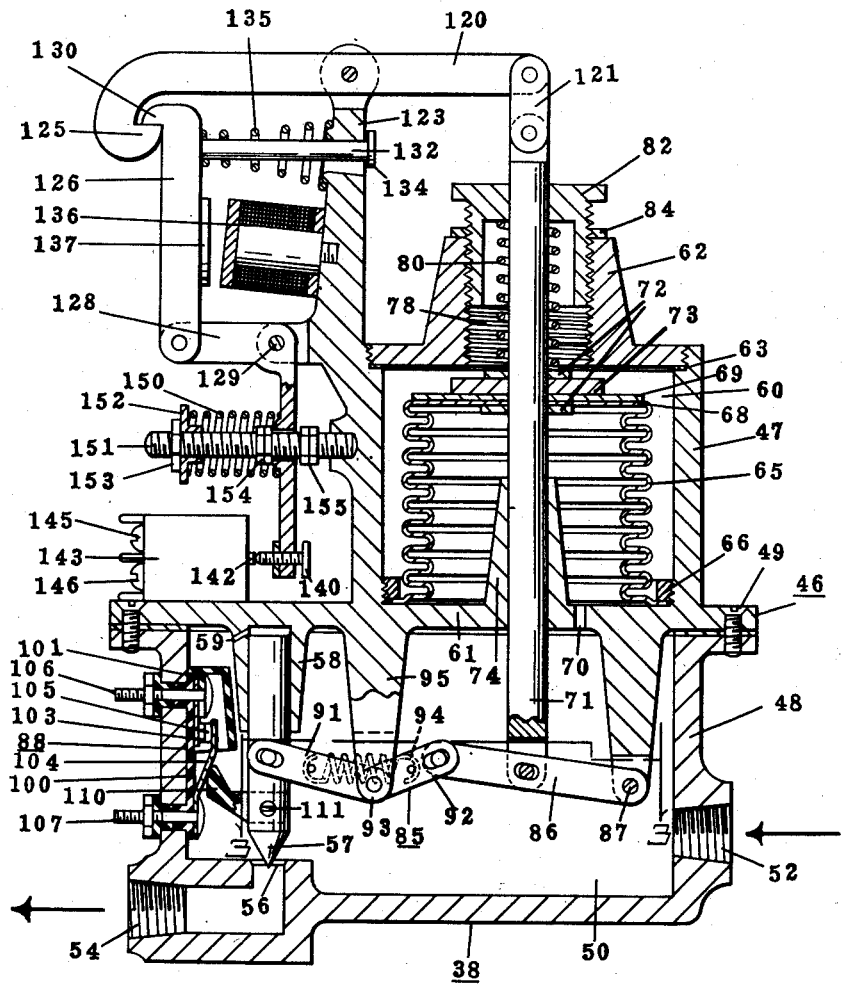
Fig 2
Fig 3
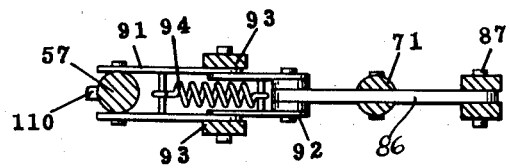
INVENTOR
Paul Haymond
BY
Warren H. F. Schmeding
ATTORNEY Patented Apr. 6, 1943

2,316,066

UNITED STATES PATENT OFFICE 2,316,066

CONTROL APPARATUS

Paul Haymond, Fairmont, W. Va.

Application August 3, 1940, Serial No. 350,889

15 Claims. (Cl. 62—4)

The present invention relates to control apparatus, and particularly to control apparatus for refrigerating systems.

An object of the invention is to provide a valve for controlling the flow of refrigerant through the evaporator of a refrigerating system, which valve is operated to increase and decrease the flow of refrigerant through the evaporator in accordance with predetermined temperatures produced in one part of the system, as for example the evaporator, and providing a device actuated in accordance with the changes in temperature in another part of the system, for example the air or medium cooled by the evaporator, for preventing operation of the valve until the temperature in the latter part of the refrigerating system attains a predetermined temperature.

Another object of the invention is to provide a valve for controlling the flow of refrigerant through the evaporator of a refrigerating system, which valve is adapted to be operated by a device in accordance with temperature changes in the evaporator, and providing mechanism for maintaining the valve in the open position regardless of the temperature in the evaporator as long as the temperature in the medium cooled by the evaporator is above a predetermined temperature.

Still another object of the invention is to provide a controller for a refrigerating system, which controller includes a control member that is operated in accordance with temperatures produced in one part of the system and an electrically responsive latch mechanism for preventing movement of the control member to one of its control positions, and which electrically responsive latch mechanism is controlled by a thermostat operable in accordance with the temperature in another part of the system for releasing the control member when the temperature in the latter part of the system attains a predetermined temperature.

A still further object of the invention is to provide a snap mechanism for operating a valve for controlling the flow of refrigerant through the evaporator of a refrigerating system, and a switch for controlling operation of the refrigerant condensing mechanism, which switch also is actuated by the snap mechanism.

Other and further objects and advantages will be apparent from the following description, reference being had to the accompanying drawings wherein a preferred form of embodiment of the present invention is clearly shown.

In the drawings:

Fig. 2 is a view on a larger scale, and partly in section, of a control apparatus shown in Fig. 1, and Fig. 3 is a view of a snap mechanism taken on substantially line 3—3 of Fig. 2.

Figure 1:
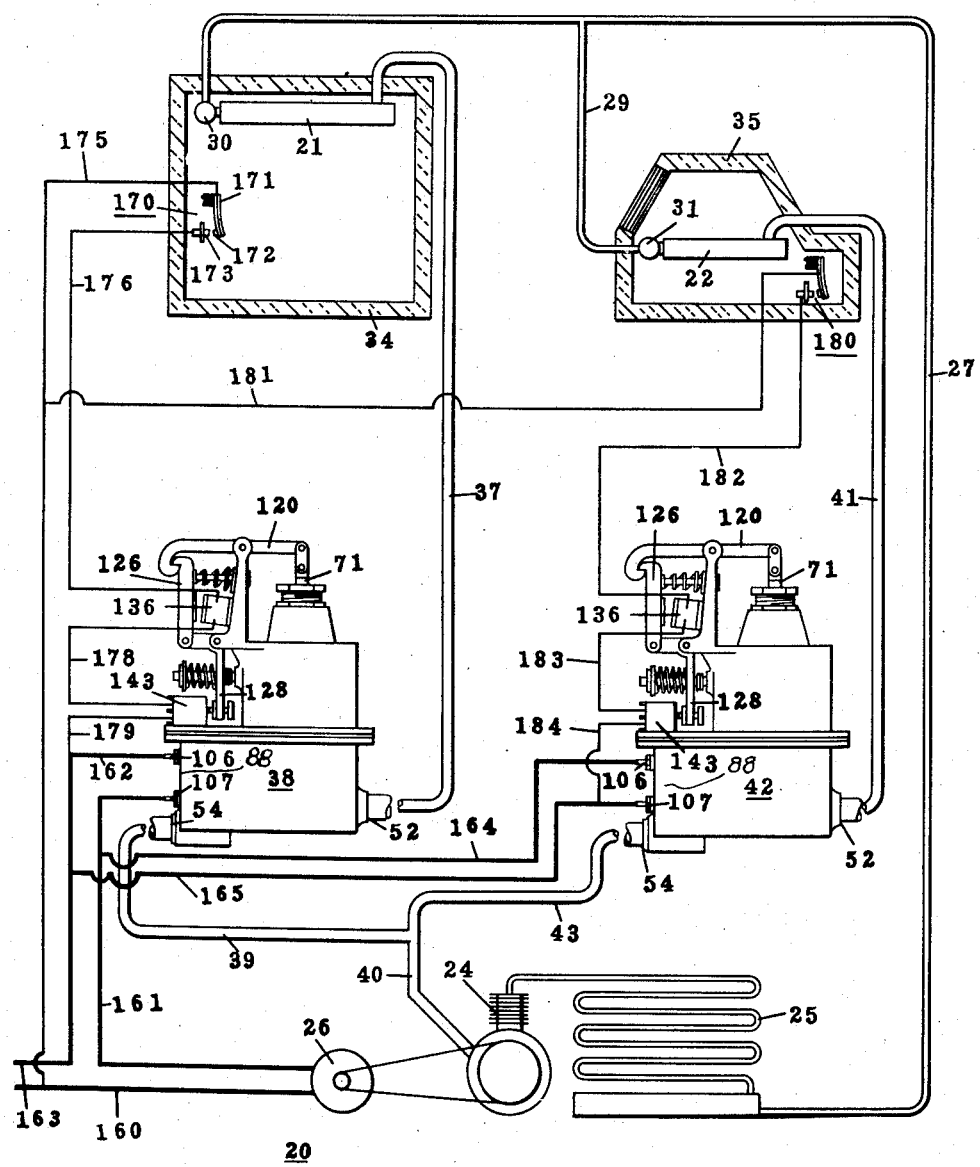
Fig. 1 is a diagrammatic illustration of a refrigerating system and control apparatus therefor.

Referring to the drawings, the invention is shown embodied in a refrigerating system indicated generally at 20, however, the invention may be embodied in different forms of refrigerating systems. The refrigerating system 20 is a compressor-condenser-expander type and includes two evaporators 21 and 22, a compressor 24 and a condenser 25. The compressor 24 is driven by an electric motor 26 and withdraws refrigerant from the evaporators and directs compressed refrigerant to the condenser 25 from whence condensed refrigerant is conducted to the evaporator 21 by a pipe 27 and to the evaporator 22 by a pipe 29, which pipe taps pipe 27. Conventional expansion valves 30 and 31 are provided at the inlets of the evaporators, although float valves could be employed. Refrigerant is withdrawn from evaporator 21 through pipe 37, control apparatus 38, and pipes 39 and 40, and from evaporator 22 through pipe 41, control apparatus 42 and pipes 43 and 40.

The evaporator 21 cools a medium in a cabinet 34 and the evaportor 22 cools a medium in a cabinet 35. In both instances the medium cooled is air. It is desirable to maintain the temperature of the air in cabinet 34 at one temperature and the temperature of the air in the cabinet 35 at another temperature. It is also desirable to prevent the collection of an appreciable amount of ice or frost on the evaporators by causing the temperatures of the evaporators to rise above the melting point of ice on each cycle of operation. To maintain the temperatures in the cabinets 34 and 35 accurately and to prevent the collection of an undesirable amount of frost on the evaporators, the control apparatuses 38 and 42 are provided for controlling the circulation of refrigerant through the evaporators 21 and 22, respectively. The apparatuses 38 and 42 permit circulation of refrigerant through the evaporators when the temperature of the respective evaporators rises to a predetermined degree above the melting point of ice and terminate the flow of refrigerant when the temperatures of the air in the cabinets are lowered to predetermined desired temperatures, or if the temperatures of the air in the cabinets are at or lower than the desired predetermined temperatures, the circulation of the refrigerant is stopped when the temperatures of the evaporators are lowered a predetermined degree. The control apparatuses also control the compressor motor 26 to cause operation of the compressor whenever the temperature of either of the evaporators is raised to the predetermined high temperature. The control apparatuses are preferably located where the temperature is always above the temperatures of the evaporators. The control apparatuses 38 and 42 are similar in construction and to clearly illustrate the details thereof the apparatus 38 is shown partly in section in Fig. 2.

Referring to Fig. 2, the control apparatus 38 includes a casing 46, comprising upper and lower sections 47 and 48 that are secured together by screws 49, the joint between the sections being sealed by a suitable gasket. A chamber 50 is formed by these sections, which chamber has an inlet 52 and an outlet 54. The inlet 52 is connected to the evaporator 21 by pipe 37 and the outlet 54 is connected with the compressor 25 by pipes 39 and 40. A valve seat 56 is formed at the inner end of the outlet 54 and a valve 57 is adapted to close the seat for controlling the flow of refrigerant through the chamber 50. The valve 57 is guided in a cylinder 58 which is vented at 59 to permit free movement of the valve.

The section 47 of the casing 46 includes a cylindrical section 60 closed at the bottom thereof by a wall 61. A cap 62 is threaded in the upper end of the cylinder 60 and a sealing gasket 63 is interposed between the cap and an annular shoulder of the cylinder. The open end of a bellows 65 is hermetically sealed to the bottom wall 61 by a collar 66 threaded in the lower end of the cylinder, which collar compresses a peripherial flange of the bellows against the wall 61. The upper end of the bellows 65 is closed by a wall 68, which wall is reenforced by a disc 69. The interior of the bellows is connected with the chamber 50 by an opening 70 in the wall 61. Thus changes in pressure in the chamber 50 will be transmitted to the interior of the bellows 65, and since the chamber 50 is connected with the evaporator 21 the gas pressure in the evaporator will affect the bellows. Thus the bellows will expand and contract according to changes in pressure in the evaporator, which changes in pressure correspond to changes in temperature of the evaporator.

A rod 71 extends through an opening in the wall 68 and is sealingly attached to this wall by washers 72 and 73. Expansion and contraction of the bellows raises and lowers the rod 71, which rod is guided by a bushing 74 formed on the wall 61. The rod 71 extends through an opening 78 in the cap 62 and a compression spring 80 is disposed around the rod and rests on the washer 72. A plug 82 is threaded in the opening 78, and is provided with a cylindrical recess for receiving the spring 80 and an opening in the top thereof through which the rod 71 extends. The tension of the spring 80 is adjusted by the plug 82, which plug may be locked in any desired adjusting position by a nut 84.

The lower end of the rod 71 is connected with a snap mechanism 85 by a lever 86 pivoted at 87, which snap mechanism is adapted to actuate the valve 57 and a switch 88. The snap mechanism 85 may be of any suitable construction, but in the embodiment shown it is a toggle comprising two opposed levers 91 and 92, pivoted on the tines 93 of a bifurcated post 95, and a spring 94 interconnecting the two levers. The levers 91 and 92 are each formed by two parallel plates spaced from one another and the spring 94 is disposed between the plates and is connected to pins interconnecting the plates forming the levers. The spring 94 biases the levers 91 and 92 to one side or the other of a dead center position of the levers and spring. The lever 86 is connected to the free end of the lever 92 by a pin and slot connection and the lever 91 is connected to the valve 57 by a pin and slot connection. When the rod 71 is raised and lowered the spring 94 is moved from one side of the dead center of the toggle to the other by the lever 92 and the lever 91 is snapped from the valve closing position to the valve opening position.

The switch 88 is inside the chamber 50, although it may be located on the outside, and it is mounted on a base 100 formed of insulating material. The switch comprises a terminal plate 101 carrying a fixed contact 103 and a spring strip 104 carrying a contact 105 that is adapted to close on contact 103. The spring strip 104 is normally biased to separate the contacts 103 and 105. A terminal post 106 is connected with the plate 101 and a terminal post 107 is connected to the spring 104. When the valve 57 is moved to the open position the strip 104 is moved to close the contact 105 on contact 103 by a lug 110 that extends laterally from the valve. The lug 110 is preferably formed of a suitable insulating material and it is secured in a slot through the valve 57 by a screw 111. When the valve is closed the lug 110 is moved from the spring 104 and the spring opens the contacts.

The upper end of rod 71 is connected with a lever 120 by a link 121, which lever is pivoted on a post 123. A hook, or catch 125 is formed on one end of the lever 120, which catch is adapted to engage a latch member 126 pivoted on a crank lever 128. A shoulder 130 is formed on the latch 126, which shoulder is adapted to engage with the catch 125 when the rod 71 moves downwardly from its raised position. The edge of the lever 120 opposite the catch 125 and the edge of the member 126 adjacent the shoulder 130 are curved to permit the lever 120 to deflect the member 126 when the lever 120 is moved to the latching position. A pin 132 extends from the member 126 through an opening in the post 123 and the end of the pin is provided with a shoulder 134 for cooperating with the post to limit counterclockwise movement of the latch member 126. A relatively light compression spring 135 is disposed about the pin 132 and between the post 123 and the latch member for biasing the latch member to the latching position. A magnetic coil 136 is mounted on the post 123 and an armature 137 is provided on the member 126 so that when the coil 136 is energized the latch member will be drawn clockwise to release the lever 120.

The crank lever 128 is pivoted at 129 and a pin 140 is threaded through the lower end of the crank lever 128, which pin engages an actuating button 142 of a snap switch 143. The snap mechanism of the switch 143 may be similar to that described in the patent to H. G. Leupold, No. 1,780,758, but it is arranged to snap the switch closed when the button 143 is pressed and to snap the switch open when the button is released. Terminals 145 and 146 are provided for connecting the switch in circuit. The crank lever 128 is biased counterclockwise by a compression spring 150 that is disposed about a threaded rod 151, which rod is threaded into the section 47 of the casing 46. A flanged bushing 152 is disposed loosely on the rod 151 and abuts the outer end of the spring 150. The tension of the spring 150 is adjusted by a nut 153 which engages the bushing 152. Clockwise movement of the crank lever 128 is limited by lock nuts 154 and counterclockwise movement of the crank member is limited by nuts 155.

Referring to Fig. 1, the control apparatus 42 is similar to the control apparatus 38 and like parts thereof are referred to by the same reference numerals. The inlet 52 of the control apparatus 42 is connected to one end of the pipe 41 and the outlet 54 is connected to the pipe 43.

The switch 88 of control apparatus 38 is connected in the circuit of motor 26, which circuit is traced as follows: main 160, motor 26, wire 161, terminal 107, switch 88, terminal 106, wire 162 and main 163. Switch 88 of apparatus 42 is also connected in the circuit for motor 26 and in parallel with switch 88 of the apparatus 38. The parallel circuit is traced as follows: wires 161 and 164, terminal 106, switch 88, terminal 107 and wires 165 and 162. It is apparent that when either one of the switches 88 is closed the motor 26 will operate.

Referring to the control apparatus 38, the circuit for the magnetic coil 136 thereof is controlled by switch 143 and a thermostatic switch 170, which latter switch is disposed inside the cabinet 34 and responsive to the air in the cabinet. The switch 170 may be of any suitable construction, but in the drawings it is shown as a bimetal strip 171 having a contact 172 that closes on a fixed contact 173 when the temperature of the air in the cabinet is reduced to a predetermined temperature. Preferably the switch is such that the closing temperature can be selected. The circuit for the coil 136 is traced as follows: main 160, wire 175, switch 170, wire 176, coil 136, wire 178, switch 143, wires 179 and 162 and main 163. When switches 143 and 170 are closed the magnetic coil 136 is energized for releasing the lever 120.

Referring to the apparatus 42, the circuit for the magnetic coil 136 thereof is controlled by the switches 143 and 180, the latter switch being subjected to the air temperature of the cabinet 35. The switch 180 is similar to switch 170 and preferably it may be adjusted to close at any predetermined temperature desired. The circuit for the coil 136 of apparatus 42 is traced as follows: Wires 175, 181, switch 180, wire 182, coil 136, wire 183, switch 143 and wires 184 and 165.

Assume, for example, that it is desirable to maintain a temperature of 38 degrees F. in the cabinet 34 and 42 degrees F. in the cabinet 35, the thermostatic switches 170 and 180 are adjusted to close at 38 degrees F. and 42 degrees F., respectively. Since it is desirable to permit the temperature of the evaporators 21 and 22 to rise above the melting point of ice during each cycle of operation to prevent the collection of an appreciable amount of ice on the evaporators, the springs 80 in each control apparatus are adjusted by the plug 82 so that the pressures in the evaporators necessary to expand the bellows 65 to cause opening of the valves 57, of the respective control apparatuses 38 and 42, will correspond to the pressure of the refrigerant at approximately 33 degrees F. It is understood, however, that the apparatuses could be adjusted to open the valves thereof at any desired temperatures nor is it essential that these temperatures be the same.

When the temperature of the evaporator 21 rises to 33 degrees F. the pressure of the refrigerant in the chamber 50 of the apparatus 38 will expand the bellows 65 which raises the rod 71 to cause the valve 57 to be opened and the switch 88 to be closed to start the compressor motor 26. As the rod 71 is raised to the valve opening position, the catch 125 of lever 120 biases the latch member 126 clockwise until the shoulder 130 of the latch 126 is over the hook and then the latch 126 is biased to the left to engage the catch. As the temperature of the evaporator 21 is lowered the pressure within the bellows 65 decreases and the spring 80 tends to collapse the bellows and lower the rod 71. As the rod 71 is lowered toward the valve closing position the lever 120 raises the latch member 126 and causes the crank lever 128 to rotate and close the switch 143. The degree of reduction in pressure in the evaporator 21 required to cause the switch 143 to be closed is determined by the adjustment of the spring 150. After the switch 143 is closed further movement of crank lever 128 is prohibited by the nuts 154 and further movement of the rod 71 to the valve opening position is prevented. As long as the temperature within the cabinet 34 is above 38 degrees F. the switch 170 will be open and the magnetic coil 136 will not be energized, but when the temperature of the cabinet 34 is lowered to 38 degrees F. the thermostatic switch 170 will close and cause energization of the magnetic coil 136 which withdraws the latch member 126 from the catch 125 of the lever 120, thereby releasing the rod 71. When the rod 71 is released the snap mechanism 85 closes the valve 57 and opens the switch 88. Also, when the latch member 126 is disengaged from the hook 125, the crank lever 128 is biased counterclockwise and the switch 143 is opened, thereby deenergizing the magnetic coil.

In the event that after a cooling phase is initiated in the evaporator 21 and the temperature of the air in the cabinet 34 is reduced to 38 degrees F. before the switch 143 is closed, the magnetic coil 136 will not be energized until the switch 143 is closed. This insures a short cycle of operation which is desirable to cause air circulation in the cabinet.

The control apparatus 42 operates in a similar manner to that described with reference to the apparatus 38, but the apparatus 42 will not close its valve 57 and open its switch 88 until the temperature of the air in the cabinet 35 is reduced to at least 42 degrees F., at which temperature the switch 180 closes the circuit for the coil 136 to release the lever 120.

It is apparent that the control apparatuses 38 and 42 control the flow of refrigerant from the evaporators 21 and 22 to the compressor 25 independently of one another but the compressor motor 26 is operated as long as the valves 57 of either one of the two control apparatuses is open. By using applicant's control apparatus where a plurality of heat absorbers are supplied with a heat exchange fluid, the temperatures of each one of the heat absorbers and the mediums effected thereby may be accurately controlled.

While the form of embodiment of the present invention as herein disclosed constitutes a preferred form, it is to be understood that other forms might be adopted, all coming within the scope of the claims which follow.

I claim:

1. A refrigerating system comprising in combination, a plurality of evaporators; means for withdrawing gaseous refrigerant from the evaporators, condensing the refrigerant and delivering refrigerant to the evaporators; a valve for controlling the flow of refrigerant through one of the evaporators; means responsive to pressure changes in said one evaporator for actuating the valve; a second valve for controlling the flow of refrigerant through another of the evaporators; means responsive to pressure changes in said other evaporator for actuating the second valve; and control means actuated by the second mentioned means for initiating operation of the first mentioned means when the first mentioned valve is opened, said control means also being actuated by the third mentioned means for initiating operation of the first mentioned means when the second valve is opened, and said control means being actuated by the second and third mentioned means to terminate operation of the first mentioned means only when both of said valves are closed.

2. A refrigerating system comprising in combination, a plurality of evaporators; electrically controlled means for withdrawing gaseous refrigerant from the evaporators, condensing the refrigerant and delivering refrigerant to the evaporators; a valve for controlling the flow of refrigerant through one of the evaporators; a switch in the circuit of the first mentioned means; means for opening and closing the valve and actuating the switch in response to pressure changes in the said one evaporator; a second valve for controlling the flow of refrigerant from another of the evaporators; a second switch connected in the circuit of the first mentioned means and in parallel circuit with the first mentioned switch; and means responsive to pressure changes in the said other evaporator for opening and closing the second valve and for actuating the second switch.

3. A refrigerating system comprising in combination, a cabinet; an evaporator disposed in the cabinet for cooling a medium in the cabinet; means for withdrawing refrigerant from the evaporator, condensing the refrigerant and delivering refrigerant to the evaporator; a valve for controlling the flow of refrigerant through the evaporator; automatic means for operating the valve between two control positions in accordance with changes in temperature; and second automatic means operable in accordance with the attainment of a predetermined temperature for preventing movement of the valve to one of its control positions by the first mentioned automatic means until the attainment of a second predetermined temperature, one of said automatic means being operable in accordance with changes in the temperature of the evaporator and the other of said automatic means being operable in accordance with changes in the temperature of the medium in the cabinet.

4. A refrigerating system comprising in combination, a cabinet; an evaporator in the cabinet for cooling a medium in the cabinet; means for withdrawing refrigerant from the evaporator, condensing the refrigerant and delivering refrigerant to the evaporator; a valve for controlling the flow of refrigerant through the evaporator; means for opening and closing the valve in accordance with the attainment of predetermined temperatures, respectively, of the evaporator; means operable in accordance with changes in the temperature of the medium in the cabinet for preventing closing of the valve by the second mentioned means while the temperature of the medium is above a predetermined temperature; and control means for the first mentioned means, said control means being operated by the second mentioned means.

5. A refrigerating system comprising in combination, a cabinet; an evaporator for cooling a medium in the cabinet; means for withdrawing refrigerant from the evaporator, condensing the refrigerant and delivering refrigerant to the evaporator; a valve for controlling the flow of refrigerant through the evaporator; means for opening and closing the valve in accordance with the attainment of predetermined temperatures, respectively, of the evaporator; and means operable in accordance with changes in the temperature of the medium in the cabinet for preventing closing of the valve by the second mentioned means while the temperature of the medium is above a predetermined degree.

6. A refrigerating system comprising in combination, an evaporator; means for controlling the circulation of refrigerant through the evaporator including a member and a device for moving the member to different control positions in accordance with changes in temperature of the evaporator; means for preventing movement of the member to one of its control positions; electrically operated mechanism for rendering the last mentioned means inoperative for permitting movement of the member to said one control position; and a switch for controlling the electrically operated mechanism, said switch being actuated by the said device in accordance with the attainment of a predetermined temperature of the evaporator.

7. A refrigerating system comprising in combination, a cabinet; an evaporator for cooling a medium in the cabinet; means for withdrawing refrigerant from the evaporator, condensing the refrigerant and delivering refrigerant to the evaporator; means for controlling the flow of the refrigerant through the evaporator including a control member and a device operable in accordance with the attainment of predetermined temperatures for operating the control member; means for preventing movement of the member to one of its control positions by said device; electrically operated means for rendering the third mentioned means inoperative; a switch for controlling the electrically operated means; and a device operable in accordance with changes in temperature for actuating the switch, one of said operable devices being operable in accordance with changes in the temperature of the evaporator and the other device being operable in accordance with the temperature of the medium in the cabinet.

8. A refrigerating system comprising in combination, a cabinet; an evaporator for cooling a medium in the cabinet; means for withdrawing refrigerant from the evaporator, condensing the refrigerant and delivering refrigerant to the evaporator; means for controlling the flow of refrigerant through the evaporator, said means including a movable control member and a device operable in accordance with changes in temperature for actuating the control member; means for preventing movement of the control member to one of its control positions by said device; an electrically operated mechanism for rendering the third mentioned means inoperative; a circuit for the electrically operated mechanism including two switches, one of said switches being moved to closed position by said device in accordance with the attainment of a predetermined temperature; and a second device operable in accordance with changes in temperature for closing the other of said switches in accordance with the attainment of a predetermined temperature, one of said devices being operable in accordance with changes in the temperature of the evaporator and the other of said devices being operable in accordance with changes in the temperature of the medium in the cabinet.

9. A refrigerating system comprising in combination, a cabinet; an evaporator for cooling a medium in the cabinet; means for withdrawing refrigerant from the evaporator, condensing the refrigerant and delivering refrigerant to the evaporator; a valve for controlling the flow of the refrigerant through the evaporator; means movable between two positions in accordance with the attainment of two predetermined temperatures, respectively, produced by increase and decrease in circulation of refrigerant through the evaporator, for opening and closing the valve, said second mentioned means having a catch; a latching device cooperating with the catch, when the second mentioned means is moved to one of said positions, for preventing movement of the second mentioned means to the other of said positions; a magnet for operating the latch to release said second mentioned means; and a thermally responsive switch for controlling the magnet, said switch being operable in accordance with changes in the temperature of the medium of the cabinet.

10. A refrigerating system comprising in combination, an evaporator; electrically energized means for withdrawing refrigerant from the evaporator, condensing the refrigerant and delivering refrigerant to the evaporator; a valve for controlling the flow of refrigerant through the evaporator; means operable in accordance with changes in temperatures produced by warming and cooling operations of the evaporator for opening and closing the valve, the last mentioned means including a snap mechanism for operating the valve; and a switch for controlling the first mentioned means, said switch being opened and closed by said snap mechanism when said mechanism closes and opens the valve, respectively.

11. A refrigerating system comprising in combination, a cabinet; an evaporator for cooling a medium in the cabinet; electrically operated means for withdrawing refrigerant from the evaporator, condensing the refrigerant and delivering refrigerant to the evaporator; a valve for controlling the flow of refrigerant through the evaporator; a switch for controlling said means; snap acting mechanism for operating the valve and switch; automatic means for actuating said mechanism, said automatic means having a catch; a latch device cooperating with the catch when the valve and switch are moved to one control position by the automatic means, for preventing movement of the valve and switch to another control position by the automatic means; a magnet for operating the latch to release the catch; a switch for controlling energization of the magnet; and automatic means for actuating the last mentioned switch, one of said automatic means being operable in accordance with temperature changes in the evaporator and the other automatic means being operable according to changes in temperature of the medium.

12. A refrigerating system comprising in combination, an evaporator; electrically operated means for withdrawing refrigerant from the evaporator, condensing the refrigerant and delivering refrigerant to the evaporator; a valve for controlling the flow of refrigerant through the evaporator; a switch for controlling said means; snap acting mechanism for operating the valve and switch; a second means movable between two positions in accordance with the attainment of two predetermined temperatures respectively, of the evaporator for actuating said mechanism, said second mentioned means having a catch; a latch cooperating with said catch, when the second mentioned means is moved to one of said positions for preventing movement of the second mentioned means to the other of said positions; a magnet for operating the latch to release said second mentioned means; a circuit for the magnet; a switch in said circuit, said second mentioned switch being moved to closed position after a predetermined movement of the said second mentioned means from said one position toward said other position.

13. A refrigerating system comprising in combination, a cabinet; an evaporator for cooling a medium in the cabinet; electrically controlled means for withdrawing refrigerant from the evaporator, condensing the refrigerant and delivering refrigerant to the evaporator; a switch for controlling said means; automatic means operable in accordance with changes in temperature for actuating the switch; means for preventing movement of the switch to one of its control positions by said automatic means; electrically operated means for rendering the third mentioned means inoperative; a switch for controlling said electrically operated means; and automatic means operable in accordance with the attainment of a predetermined temperature for actuating the last mentioned switch, one of said automatic means being operable in accordance with changes in the temperature of the evaporator and the other of said automatic means being operable in accordance with changes in the temperature of the medium.

14. A refrigerating system comprising in combination, a cabinet; an evaporator for cooling a medium in the cabinet; electrically operated means for withdrawing refrigerant from the evaporator, condensing the refrigerant and delivering refrigerant to the evaporator; a switch for controlling operation of said means; automatic means operable in accordance with changes in temperature for actuating the switch; means for preventing movement of the switch to one of its control positions by said automatic means; electrically operated mechanism for rendering the third mentioned means inoperative to permit movement of the switch to said one position by said automatic means; a switch for controlling the electrically operated mechanism, said second mentioned switch being closed by said automatic means in accordance with the attainment of a predetermined temperature; a second switch for controlling the electrically operated mechanism; and automatic means for operating the last mentioned switch in accordance with changes in temperature, one of said automatic means being operable in accordance with changes in the temperature of the evaporator and the other of said automatic means being operable in accordance with changes in the temperature of the medium.

15. A refrigerating system comprising in combination, a cabinet; an evaporator for cooling a medium in the cabinet; electrically operated means for withdrawing refrigerant from the evaporator, condensing the refrigerant and delivering refrigerant to the evaporator; a switch for controlling operation of said means; means for actuating the switch in accordance with the attainment of predetermined temperatures in the evaporator, said second mentioned means having a catch; a latch mechanism cooperating with said catch for preventing movement of the switch to one of its control positions by the second mentioned means; a magnet for operating the latch to release the second mentioned means; a circuit for energizing the magnet; and means operable in accordance with changes in the temberature of the medium in the cabinet for controlling the circuit.

PAUL HAYMOND.